United States Patent [19]

Brems

[11] Patent Number: 4,796,477
[45] Date of Patent: Jan. 10, 1989

[54] ROTARY REVERSIBLE INDEXING MECHANISM

[76] Inventor: John H. Brems, Apt. 16-D, 2800 S. Ocean Blvd., Boca Raton, Fla. 33432

[21] Appl. No.: 557,467

[22] Filed: Dec. 5, 1983

[51] Int. Cl.$^4$ ............................................. F16H 37/12
[52] U.S. Cl. ........................................ 74/52; 74/394
[58] Field of Search ................ 74/52, 63, 393, 394, 74/25

[56] References Cited

U.S. PATENT DOCUMENTS

| | | |
|---|---|---|
| 2,655,817 | 10/1953 | Armelin ................................. 74/394 |
| 2,748,616 | 6/1956 | Foster et al. .......................... 74/394 |
| 3,426,609 | 2/1969 | Princz et al. .......................... 74/394 |
| 3,603,168 | 9/1971 | Kaplan .................................. 74/394 |
| 3,960,024 | 6/1976 | Mori et al. ............................. 74/52 |
| 4,018,090 | 4/1977 | Brems ..................................... 74/52 |
| 4,089,228 | 5/1978 | Obra ...................................... 74/394 |

FOREIGN PATENT DOCUMENTS

| | | |
|---|---|---|
| 1129029 | 5/1962 | Fed. Rep. of Germany ........ 74/394 |
| 54265 | 3/1983 | Japan ..................................... 74/394 |

Primary Examiner—John Rivell
Attorney, Agent, or Firm—Barnes, Kisselle, Raisch, Choate, Whittemore & Hulbert

[57] ABSTRACT

An intermittent reversible indexing system having a rotary input and a rotary output with variable kinematic characteristics including an epicycloidal drive with dwell characteristics. A planetary carrier carrying a single planetary gear is driven about a first axis with the planetary gear in mesh with a stationary reaction gear concentric about said first axis. A drive member in the form of a shaft eccentric to the axis of the planetary engages and slides in a slot of an output member, thereby driving an output member about a second axis displaced from said first axis. The reaction gear is mounted for oscillation and a mechanism for oscillating the reaction gear is driven by an input power means which also drives the planetary carrier. A crank and lever mechanism or a simple cam mechanism can be used to oscillate the reaction gear in response to the input power means.

5 Claims, 2 Drawing Sheets

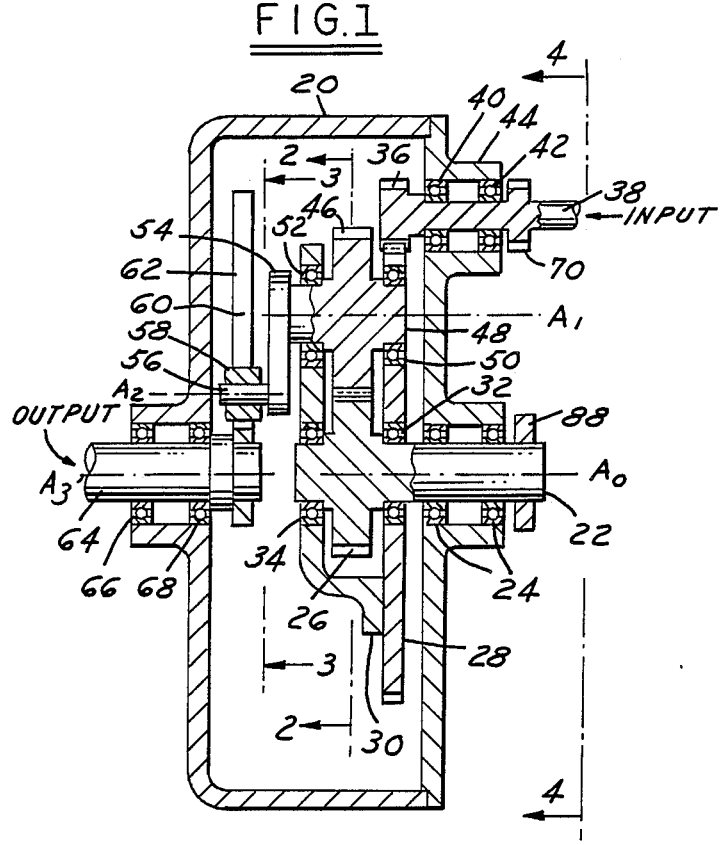
FIG.1
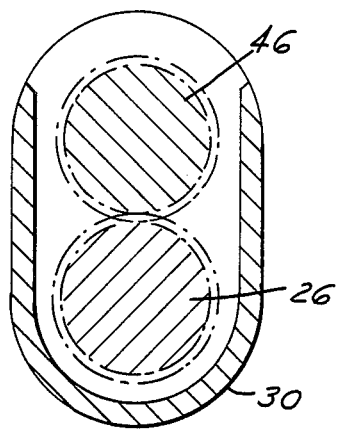
FIG.2
FIG.3
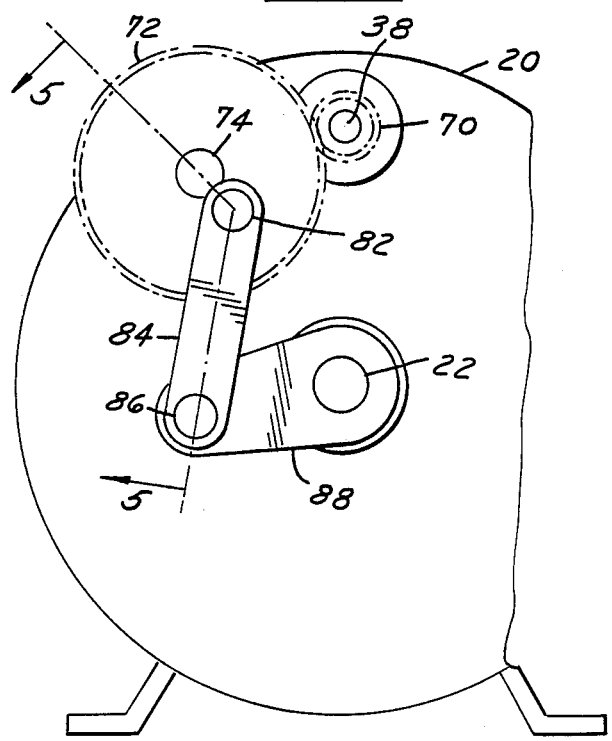
FIG.4
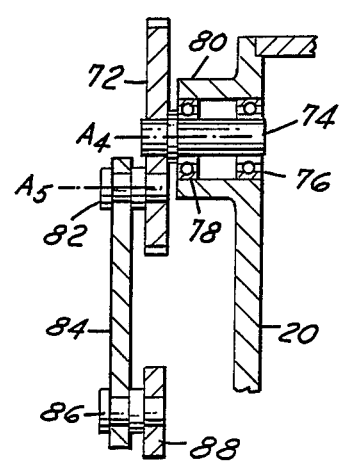
FIG.5

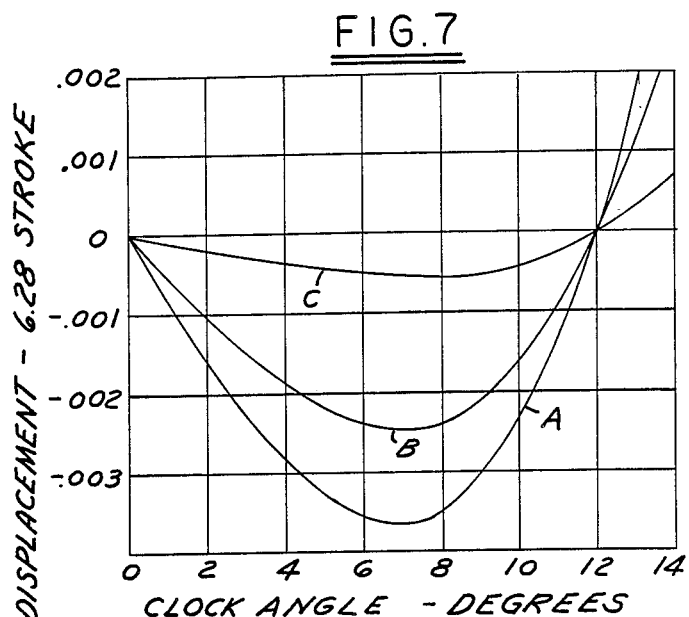
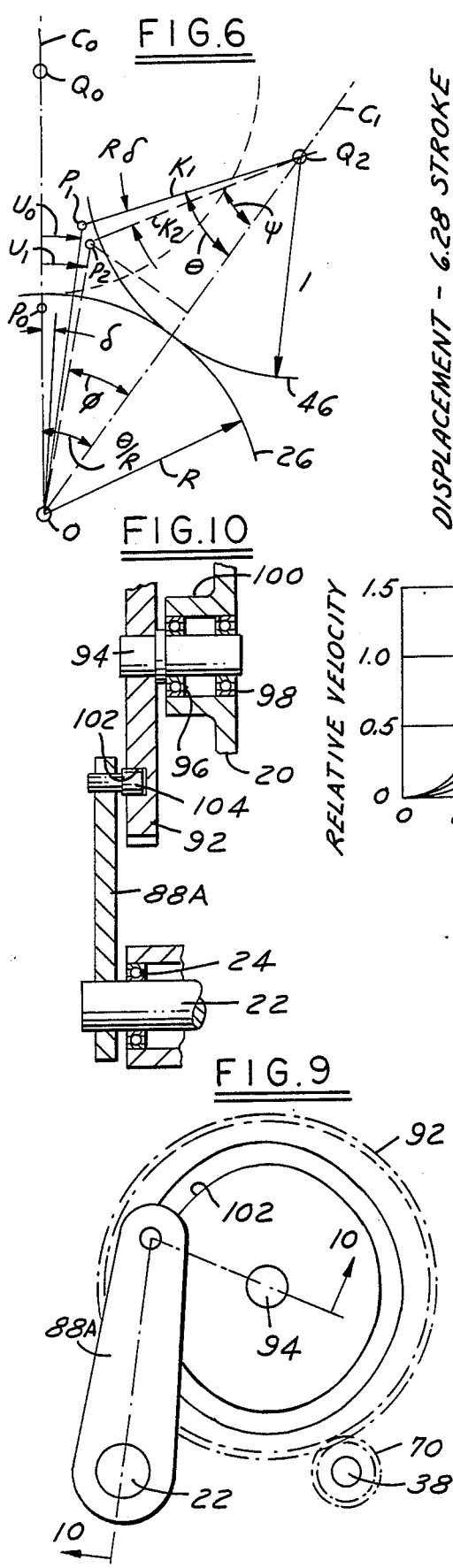
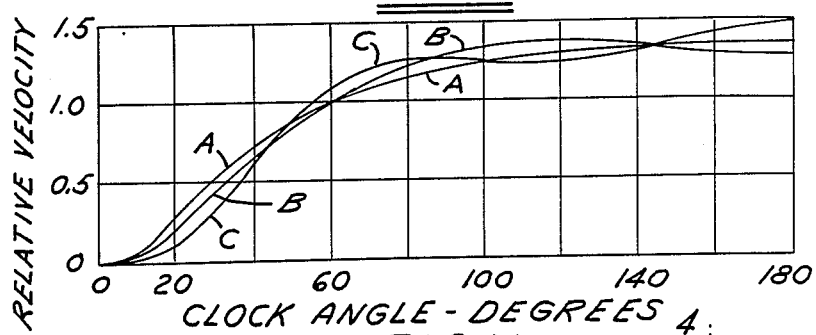
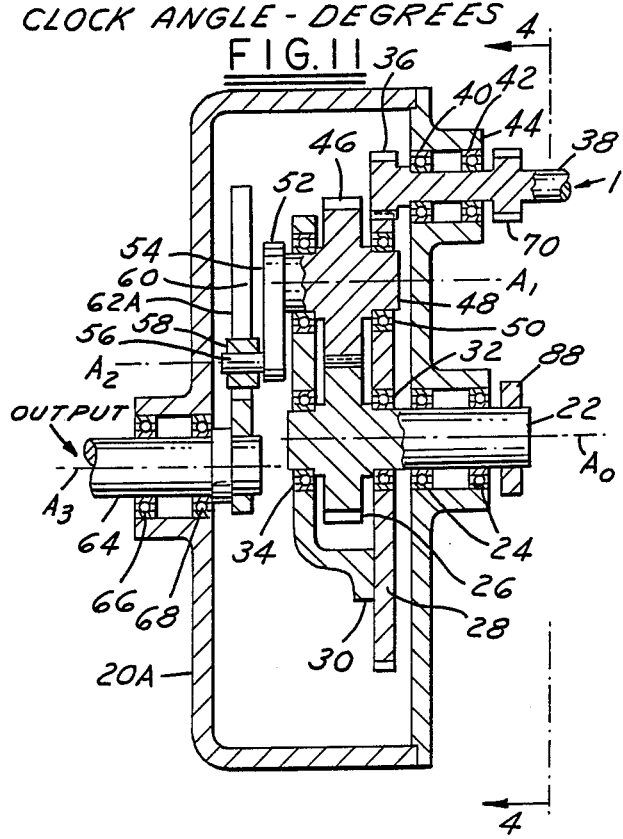

[4,796,477]

ROTARY REVERSIBLE INDEXING MECHANISM

FIELD OF INVENTION

Rotary input and rotary output mechanism with a wide range of kinematic flexibility and superior dwell characteristics.

BACKGROUND AND OBJECTS OF THE INVENTION

In the driving of mechanisms with a rotary input, it is oft times desirable to gain an epicycloidal rotary output which, in the course of a cycle, will have a dwell characteristic which in practical applications will permit loading or unloading of a part during the dwell. Other objectives include a mechanism which has kinematic flexibility to adapt to various applications.

It is one object of the present invention to provide a mechanism which has a wide range of kinematic flexibility.

It is another object of this invention to provide a mechanism having dwell characteristics superior to those of the prior art epicycloidal drive mechanism.

It is another object of this invention to provide a mechanism in which a simple cam can be used as a vernier on the output characteristics of the prior art epicycloidal drive.

It is another object of this invention to combine the improvements of the mechanism disclosed in my U.S. Pat. No. 4,018,090 with the aforesaid objective improvements to the epicycloidal drive.

Other objects and features of the invention will be apparent in the following specification and claims in which the invention is disclosed together with details to enable persons skilled in the art to practice the invention, all in connection with the best mode presently contemplated for the invention.

BRIEF DESCRIPTION OF THE DRAWINGS

Drawings accompany the disclosure and the various views thereof may be briefly described as:

FIG. 1, a longitudinal section through a typical embodiment of the invention;

FIG. 2, a transverse section taken on line 2—2 of FIG. 1;

FIG. 3, a transverse section taken on line 3—3 of FIG. 1;

FIG. 4, an end view of the invention taken on line 4—4 of FIG. 1;

FIG. 5, a transverse folded section taken on line 5—5 of FIG. 4;

FIG. 6, a schematic line kinematic drawing for defining parameters and variables;

FIG. 7, a series of curves showing illustrative displacement characteristics near the beginning of a cycle;

FIG. 8, a series of curves showing the output velocity as a function of input angle for the same set of illustrative parameters as for the curves of FIG. 7;

FIG. 9, a view analogous to view 4 showing an alternate mechanism for generating sun gear oscillation;

FIG. 10; a transverse folded section taken on line 10—10 of FIG. 9; and

FIG. 11, a longitudinal section of an alternate embodiment of this invention incorporating the offset input and output axes of my U.S. Pat. No. 4,018,090.

Referring to FIGS. 1, 2 and 3, a case 20 supports a shaft 22 through bearings 24 on axis $A_o$; a sun gear 26 in turn is concentrically mounted on or made concentric with the shaft 22. A planetary carrier assembly is made up of a plate 28 and a housing 30 bolted thereto. This planetary carrier 28, 30 is mounted to the shaft 22 through bearings 32 and 34 and also rotates about the axis $A_o$. The periphery of the plate 28 is formed into a gear suitable for meshing with an input gear 36 mounted on a shaft 38 which rotates in bearings 40 and 42 mounted in a boss 44 mounted on the case 20.

The shaft 38 is rotated by some external drive source such as a reversible electric motor and gear reducer with a suitable brake (not shown) to be utilized at the end of the stroke. Rotation of the shaft 38 causes the planetary carrier 28, 30 to rotate about the fixed axis $A_o$.

A planetary gear 46 suitably formed to mesh with the sun gear 26 is mounted on a planetary shaft 48 which in turn is mounted to the planetary carrier 28, 30 through bearings 50 and 52. The planetary gear 46 rotates on the moving axis $A_1$ as the planetary carrier 28, 30 rotates about axis $A_o$.

An eccentric support plate 54 is mounted to the planetary shaft 48 and has projecting therefrom an eccentric shaft 56 on an axis $A_2$ displaced from the axis $A_1$. A slide block 58 is rotatably mounted on the eccentric shaft 56; this slide block 58 in turn is slidably movable in a slot 60 of an output spider 62 (FIG. 3). This output spider 62 is mounted on an output shaft 64 which rotates in bearings 66 and 68 mounted in the case 20. The shaft 64 and output spider 62 also rotate about the axis $A_o$, i.e., concentrically with the planetary carrier rotation.

The mechanism described up to this point, and assuming the shaft 22 and sun gear 26 are held stationary with respect to the case 20, is known and commonly referred to as an epicycloidal drive. The improvement which comprises a first embodiment of this new invention will now be described.

Referring to FIGS. 1, 4 and 5, a pinion 70 is also mounted on the input shaft 38; this pinion 70 meshes with a gear 72 mounted on a shaft 74 journalled through bearings 76 and 78 in a boss 80 which is part of the case 20. The gear 72 and shaft 74 rotate on a fixed axis $A_4$. A crankpin 82 is eccentrically mounted on axis $A_5$ on the gear 72 and on it is journalled a connecting rod 84 whose other end is connected through a pivot pin 86 to a lever 88 mounted on the outboard end of the sun gear mounting shaft 22.

It can be seen, therefore, that, as the input shaft 38 is rotated by an external drive, the pinion 70 drives the gear 72 causing the eccentric crankpin 82 to impart an oscillating movement to the lever 88 through the connecting rod 84. This oscillating motion is transmitted to the sun gear 26 through the shaft 22. The amplitude of this oscillating motion is controlled by the distance between axis $A_4$ and $A_5$, and its frequency is determined by the gear ratio between pinion 70 and gear 72 relative to the gear ratio between pinion 36 and the gear cut into the periphery of the planetary carrier plate 28.

With the proportions illustrated in FIGS. 1 and 2, the planet gear 46 has the same pitch diameter as the sun gear 26; furthermore, as is appropriate for most applications, the centerline $A_2$ of the eccentric shaft 56 is approximately coincident with the pitch line of the planet gear 46, as is shown.

The mechanical system described above may be mathematically analyzed by referring to FIG. 6. The radius of the planet gear 46 is arbitrarily set to 1 which establishes the scale of the system. Other variables are defined as follows:

R is the radius of the sun gear 26;

O is a point, the center of the sun gear 26;

Q is a point, the center of the planet gear 46 shown in an initial position $Q_o$ and a second position $Q_2$, P is a point, the center of the eccentric shaft 56 shown in three positions $P_0$, $P_1$ and $P_2$ to be described, K is the radial distance from the point Q to the point P, shown in two positions $K_1$ and $K_2$, C is the line connecting the point 0 to the point Q and is shown in two positions $C_0$ and $C_1$.

The various angles will be defined in the course of the following analysis. At the beginning of a defined cycle, the points O, P and Q are colinear, with point P lying between points Q and O. These points are designated as O, $P_o$ and $Q_o$ in FIG. 6; the line C running through them is designated $C_o$. It is from this base position that all subsequent movements and angles are measured. Stated another way, the center of eccentric shaft 56, P lies between and on a line connecting the center of the sun gear 26, O, and the center of the planet gear 46, Q, at the base or starting position of the movements to be described.

The total output movement generated in the output spider 62 is created from two sources: the rotation of the planetary carrier which causes the planet gear to roll on the sun gear, and the oscillation of the sun gear as previously described. These two effects will be considered separately and the results superimposed.

It will be temporarily assumed that the sun gear is held stationary and the planetary carrier rotated through an angle $\theta/R$ which moves the line C from $C_o$ to $C_1$. The planet gear therefore rotates through an angle $\theta$ with respect to the line C. This angle $\theta$ is referred to as the clock angle since it will have a value of 360° at the end of a cycle, i.e., when the planet gear has made one complete revolution and the point P returns to a base position. After the planet gear has rotated through the angle $\theta$, point P moves from $P_o$ to $P_1$ and K reaches the position $K_1$. The output movement generated in the output spider is the angle between the lines $OP_o$ and $OP_1$ which is designated $U_o$. The angle $P_1OQ_2$ is seen to be:

$$\arctan\left(\frac{K\sin\theta}{R + 1 - K\cos\theta}\right)$$

The output movement, $U_o$, (for a stationary sun gear) can then be seen to be:

$$U_o = \frac{\theta}{R} - \arctan\left(\frac{K\sin\theta}{R + 1 - K\cos\theta}\right) \tag{1}$$

From this position, the effect of the rotation of the sun gear is now superimposed. The sun gear is rotated through an angle $\delta$ clockwise as shown in FIG. 6. For this superposition, the planetary carrier and line $C_1$ are now assumed to be stationary. The clockwise rotation of the sun gear through an angle $\delta$ causes the planet gear to rotate through an angle $R\delta$ in the counterclockwise direction. The point P moves from $P_1$ to $P_2$ and line K from $K_1$ to $K_2$. The total output movement generated in the output spider as a result of this superposition is the angle between the lines $OP_o$ and $OP_2$ designated as $U_1$. The following relationships can be seen:

$$U_1 = \frac{\theta}{R} - \phi \tag{2}$$

$$\phi = \arctan\left(\frac{K\sin\psi}{R + 1 - K\cos\psi}\right) \tag{3}$$

$$\psi = \theta - R\delta \tag{4}$$

By combining equations (2), (3), and (4), the total output function of $\theta$ and $\delta$ is obtained:

$$U_1 = \frac{\theta}{R} - \arctan\left(\frac{K\sin(\theta - R\delta)}{R + 1 - K\cos(\theta - R\delta)}\right) \tag{5}$$

The angle $\delta$ is itself a cyclicly varying angle whose magnitude is determined by the eccentricity of the crankpin 82 relative to the centerline of the shaft 74 (FIG. 4) and the distance between pin 86 and shaft 22 on lever 88; and whose rate of variation is determined by the gear ratios between gears 70 and 72, gears 36 and 28, and the gear ratio between the planet gear 46 and the sun gear 26. These various ratios can be combined into a single factor N such that the gear 72 makes N revolutions for each revolution of the planet gear 46. The maximum magnitude of oscillation for the angle $\delta$ will be defined as $\Delta$ and is determined as described above. Therefore, the instantaneous value of $\delta$ may be closely approximated by the expression:

$$\delta = \Delta\sin(N\theta + \alpha) \tag{6}$$

where $\alpha$ is a phase angle.

If $\delta$ is O when $\theta = 0$ (no phase angle), then: $\delta = \Delta\sin(N\theta)$ \hfill (7)

By combining equations (7) and (5), the following is obtained:

$$U_1 = \frac{\theta}{R} - \arctan\left(\frac{K\sin[\theta - R\Delta\sin(N\theta)]}{R + 1 - K\cos[\theta - R\Delta\sin(N\theta)]}\right) \tag{8}$$

There are various objectives which can be achieved by the introduction of an oscillation of the sun gear in the mechanism described above. One illustrative example is the improvement of the dwell of the output member on either side of the base position. In many applications, an absolute standstill of the output member during dwell is not required, but a slight rocking movement is acceptable. The effect of a slight sun gear oscillation to decrease this rocking movement of the output member during dwell is illustrated in FIG. 7, which is a comparison of the dwell characteristics of three situations to be described.

For all three curves A, B and C, the value of R is taken as 1, i.e., the planet gear and sun gear are equal in size and the planet gear makes one revolution with respect to the planetary carrier for each revolution of the planetary carrier about the sun gear.

Curve A is a reference curve and represents a plot of equation 1 with $K = 1.02234$ while $U_o$, the output, is plotted in radians; $U_o$ therefore reaches a value of $2\pi$ (6.28) after one complete cycle. The value of K (1.02234) was determined such that $U_o$ was equal to 0 at the arbitrarily chosen angle $\theta = 12°$, which requires an iterative calculation technique. Then $U_o=0$ for $\theta-12°$ and additionally it can be seen $U_o=0$ at $\theta=0$. The output displacement $U_o$ therefore has a value of zero at three closely spaced points $\theta=-12°$, $0°$, and $12°$ and has a maximum amplitude therebetween of $\pm 0.0037$ relative to 6.28 for a full cycle. The output therefore rocks through an amplitude of $\pm 0.0589\%$ of the total stroke per cycle, for $\pm 12°$ of planet movement.

Curve B illustrates the output behavior, as calculated from equation (8) with $R=1$, as before, but with $N=2$ and $A=0.1$. Under these conditions, it was found that for $U_1=0$ at $\theta=\pm 12°$, $K=1.12544$, again using iterative techniques. Using these values for R, N, $\Delta$ and K in equation (8), the curve B was plotted over the same input span as for curve A. It can be seen that the maximum output rock is $\pm 0.00245$ (relative to 6.28 cycle stroke) over the same input span, a one-third improvement over a system in which the sun gear is held stationary. Mechanically the fact that $N=2$ is represented by gear ratios such that the gear 72 rotates twice for each revolution of the planet gear with respect to the planetary carrier; and since $\Delta=0.1$ and $R=1$, then the maximum amplitude of the sun gear oscillation is 0.1 radians as determined by its oscillating drive linkage shown in FIG. 4.

Curve C illustrates the output behavior, again as calculated from equation (8), with $R=1$ and $\Delta=0.1$ as before but with $N=3$ (rather than 2 as for curve B). Under these conditions, it was calculated that K must equal 1.17853 in order that $U_1=0$ at $\theta=\pm 12°$, again using iterative techniques. From curve C it can be seen that the maximum output displacement over the span of $\pm 12°$ input is 0.00055, again relative to $2\pi$. This is an 85% improvement or decrease of output rocking as compared to curve A for a stationary sun gear. Mechanically the system is the same as described for curve B, except that to achieve curve C, the gear ratios are such that gear 72 makes three revolutions for each revolution of the planet with respect to the planetary carrier.

In essence then, the addition of a slight amount of sinusoidal oscillation to the sun gear through the mechanism of FIG. 4 can be very useful in reducing the amount of output rock or oscillation within a predetermined dwell span, which in the instance of FIG. 7 was arbitrarily taken as $\pm 12°$ of clock angle. Clearly, the curves of FIG. 7 are illustrative only.

The curves of FIG. 8 are relative velocity curves where the relative velocity is defined as the ratio of the instantaneous velocity to the average velocity over a given cycle with a cycle representing one revolution of the planet gear. The data for these curves were calculated using numerical differentiation to obtain the instantaneous relative velocity.

Curve A of FIG. 8 represents the velocity behavior of a system identical with the system represented by the dwell displacement curve A of FIG. 7; i.e., it is a reference curve for a system in which the sun gear is held stationary, and in which $R=1$ and $K=1.02234$. Curves B and C of FIG. 8 in turn represent the velocity characteristics of the same systems respectively whose dwell displacement characteristics are represented by curves B and C of FIG. 7. All three curves are symmetrical about the 180° clock angle. From these curves, it can be seen that the oscillation of the sun gear also creates a slight velocity variation over t e cycle, but in many applications, this is an acceptable trade off for the improved dwell conditions.

FIGS. 9 and 10 show an alternate means of oscillating the sun gear. FIG. 9 is analogous to FIG. 4 in that it shows an external mechanism for imparting a controlled movement to the sun gear 26. The pinion gear 70 on the input shaft 38 meshes with a gear 92 mounted on a shaft 94 which is journalled through bearings 96 and 98 in a boss 100 which is part of the case 20. A female cam groove 102 is cut into one face of the gear 92. A closely fitted cam follower roller 104 operates in this groove 102; the roller 104 is mounted on the outboard end of a lever 88A which is mounted on the outer end of the shaft 22, whose inner end carries the sun gear 26. Generally, though not as a requirement, the ratio between the pinion gear 70 and the gear 92 is such that the gear 92 will make one revolution for each revolution of the planet gear with respect to the planetary carrier. It will be seen therefore that the cam groove can impart any reasonable predetermined pattern of movement on the sun gear for each cycle. This then permits a great degree of design flexibility in achieving one or more of the following objectives: a dwell of the output which is a true standstill without any rock; a slight reduction of the peak acceleration; or a slight reduction of the peak velocity; or the creation of a constant velocity over approximately half of the cycle. In effect, the cam can be utilized to act as a vernier on the basic (stationary sun gear) system characteristics that are shown by curves A in FIGS. 7 and 8.

In my existing U.S. Pat. No. 4,018,090, a mechanism is disclosed in which certain desirable improvements can be achieved by making the axis of the output shaft offset from the axis of the sun gear and planetary carrier. This mechanism is shown in a longitudinal section of FIG. 11, together with the oscillating sun gear which characterizes this new invention. It will be seen that the mechanism of FIG. 11 is identical with the mechanism of FIGS. 1–3 except that in the housing 20A the output axis $A_3$ is offset from the sun gear axis $A_o$. The member 62A is altered to accommodate the offset. If the sun gear were held stationary, this mechanism would be identical with that disclosed in my aforesaid U.S. Pat. No. 4,018,090, and whose kinematic characteristics are described therein. The mechanism shown in FIG. 11 can be combined with the sun gear oscillating mechanism shown in FIGS. 4 and 5 or that shown in FIGS. 9 and 10 with the result that the kinematic effects of the axis offset of my prior patent may be combined with the effect of the oscillating sun gear effects previously described. This clearly results in a mechanism having still greater kinematic design flexibility.

What is claimed is:

1. An intermittent reversible indexing system having a rotary input and a rotary output, with variable kinematic characteristics comprising:
   (a) a frame,
   (b) a reaction gear member mounted for oscillation in said frame and concentric about a first axis,
   (c) a planetary carrier member mounted for rotation in said frame and rotating about said first axis,
   (d) a planetary gear member mounted for rotation in said planetary carrier member and rotating about a planetary axis displaced from said first axis and adapted for driving engagement with said reaction gear member,
   (e) an eccentric shaft member mounted on said planetary gear member concentric about a third axis displaced from said planetary axis, (f) an output member mounted in said frame and rotating about an output axis and in driven engagement with said eccentric shaft member, (g) means for oscillating said reaction gear member, and (h) input power means driving said planetary carrier member about said first axis and driving said means for oscillating, whereby said planetary gear member rotates and said reaction gear member oscillates about said first axis in a predetermined relationship.

2. An intermittent reversible indexing system as in claim 1 in which said means for oscillating comprises:

(a) crank means driven by said input power means, (b) lever means mounted to said reaction gear member, (c) connecting rod means interconnecting said crank means and said lever means.

3. An intermittent reversible indexing system as in claim 2 in which said crank means rotates through an integral number of revolutions for each revolution of said planetary gear member with respect to said planetary carrier member.

4. An intermittent reversible indexing system as in claim 1 in which said means for oscillating comprises:

(a) cam means driven by said input power means, (b) lever means mounted to said reaction gear member, and (c) cam follower means mounted on said lever means and driven by said cam means.

5. An intermittent reversible indexing system as in claim 4 in which said cam means rotates through one revolution for each revolution of said planetary gear member with respect to said planetary carrier member.

* * * * *